United States Patent
Vivona et al.

(10) Patent No.: US 11,087,435 B1
(45) Date of Patent: Aug. 10, 2021

(54) ADAPTIVE DEWARPING OF WIDE ANGLE VIDEO FRAMES

(71) Applicant: Facebook, Inc., Menlo Park, CA (US)

(72) Inventors: Josiah Vincent Vivona, Poway, CA (US); Ted Taejin Kim, San Diego, CA (US); Eric W. Hwang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/673,740

(22) Filed: Nov. 4, 2019

(51) Int. Cl.
| | |
|---|---|
| H04N 5/232 | (2006.01) |
| G06T 3/60 | (2006.01) |
| G06T 3/00 | (2006.01) |
| G06T 11/60 | (2006.01) |

(52) U.S. Cl.
CPC ............. *G06T 3/0093* (2013.01); *G06T 3/60* (2013.01); *G06T 11/60* (2013.01); *H04N 5/23238* (2013.01)

(58) Field of Classification Search
CPC ......... G06T 3/0093; G06T 3/60; G06T 11/60; G06T 3/0037; G06T 11/005; G06T 11/003; G06T 5/006; G06T 5/50; G06T 7/50; G06T 7/194; G06T 5/005; H04N 5/23238
See application file for complete search history.

(56) References Cited

U.S. PATENT DOCUMENTS

| | | | | |
|---|---|---|---|---|
| 6,243,131 B1* | 6/2001 | Martin | ................... | G06T 3/0018 348/36 |
| 9,992,449 B1* | 6/2018 | Ashkenazi | ........... | H04N 5/2259 |
| 2014/0368606 A1* | 12/2014 | Bassi | ................... | H04N 13/305 348/36 |
| 2015/0278988 A1* | 10/2015 | MacMillan | ........ | H04N 5/23232 348/218.1 |
| 2016/0127641 A1* | 5/2016 | Gove | ..................... | G01B 11/00 348/143 |
| 2018/0262687 A1* | 9/2018 | Hildreth | ............... | H04N 13/344 |
| 2019/0278986 A1* | 9/2019 | Nepomniachtchi | ......................... | H04N 1/00718 |
| 2020/0394770 A1* | 12/2020 | Roulet | ............... | H04N 5/23238 |

\* cited by examiner

Primary Examiner — Dramos Kalapodas
(74) Attorney, Agent, or Firm — Fenwick & West LLP (57) ABSTRACT

A video system processes video frames from a wide angle camera to dewarp the video frames in a manner that preserves conformity of an object of interest. A crop region of a video frame corresponding to the object of interest is determined. An input parameter to a dewarping function is generated based on the detected crop region. The dewarping function is applied to the crop region using the input parameter to generate a dewarped video frame and the dewarped video frame is outputted. The input parameter may be generated in a manner that causes the dewarped video frame to have higher conformity and lower distortion in the region around the object of interest than in a region distant from the object of interest.

17 Claims, 4 Drawing Sheets

ADAPTIVE DEWARPING OF WIDE ANGLE VIDEO FRAMES

BACKGROUND

Wide angle cameras such as panoramic, hemispherical, and spherical cameras capture images having a field of view that spans a range of angles relative to the position of the camera. Rectilinear images generated from wide angle lens typically suffer from distortion resulting from the three-dimensional environment being projected onto a two-dimensional image. Such distortion can be particularly noticeable in images of human faces and may be distracting to participants of a video call.

SUMMARY

This disclosure relates generally to video processing and more specifically to adaptively dewarping wide angle video frames based on a region of interest.

A method, non-transitory computer-readable storage medium, and computer system process video frames from a wide angle camera to dewarp the video frames in a manner that preserves conformity of an object of interest such as a human face, thereby maintaining relative proportions of features in a localized region. A video frame captured by a wide angle camera is received. A crop region of the video frame bounding an object of interest is detected. An input parameter to a dewarping function is generated based on the crop region. The dewarping function is applied to the crop region using the input parameter to generate a dewarped video frame and the dewarped video frame is outputted.

In an embodiment, the input parameter is generated in a manner that causes the object of interest in the dewarped video frame to have higher conformity than regions of the dewarped video frame distant from the object of interest. For example, in an embodiment generating the input parameter comprises predicting a target vertical position in the video frame of the object of interest based on the crop region and determining a tilt parameter as a function of the target vertical position in the video frame. The tilt parameter may be applied as an input to the dewarping function (e.g., a Mercator projection) that maps pixels of the crop region of the video frame to the output video frame.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
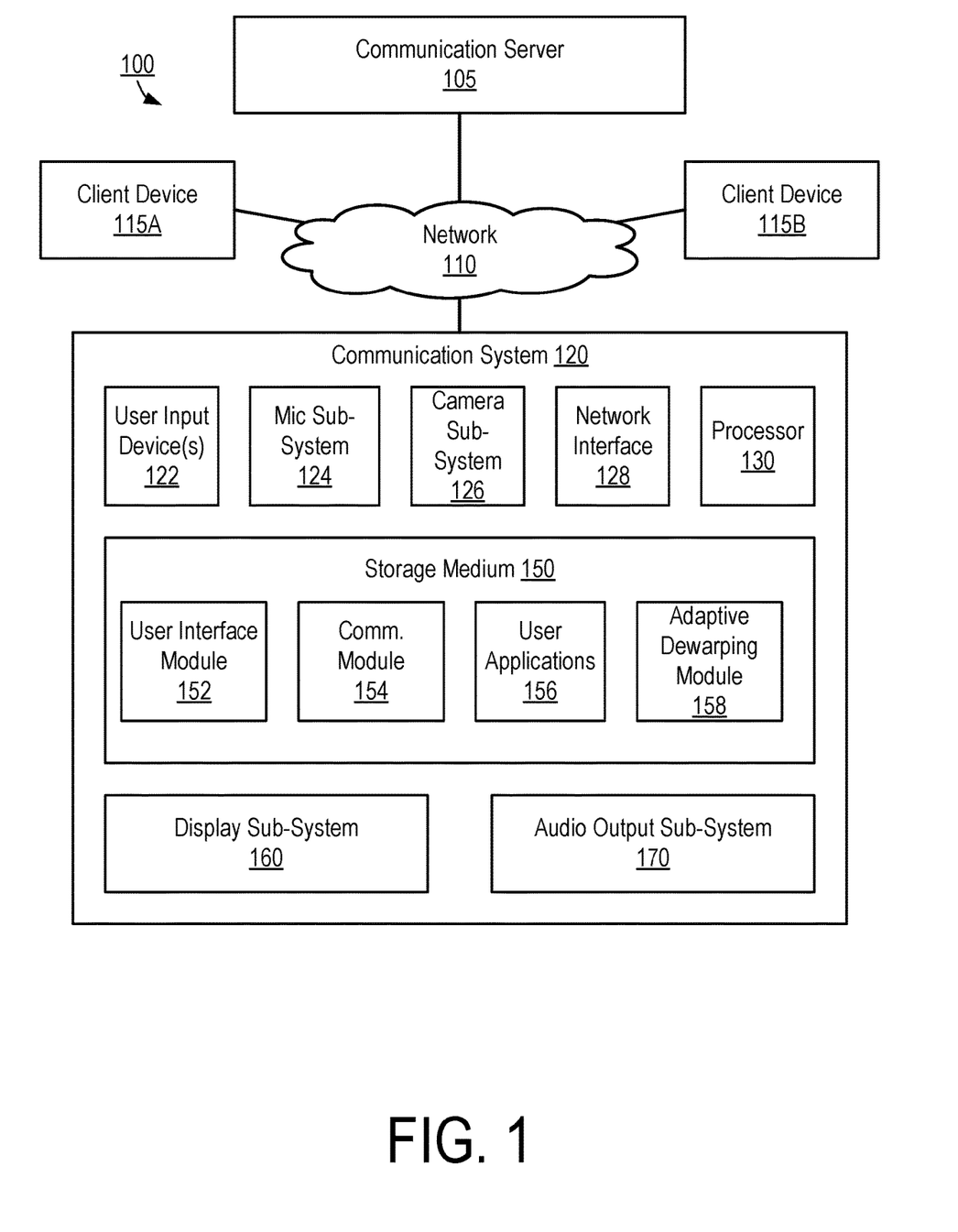
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, an adaptive dewarping module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and an adaptive dewarping module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The adaptive dewarping module 158 dewarps video frames of video captured by the camera sub-system 126 prior to storing the video frames or transmitting the video frame via the network interface 128.

In an embodiment, the adaptive dewarping module 158 obtains a crop region of a captured wide angle image that represents a region of interest. For example, the crop region may be represented a region bounding a detected human body or face. The crop region may comprise, for example, a rectangular region representing a subset of pixels of the original image. The adaptive dewarping module 158 applies a projection function to the crop region that projects the pixels of the crop region to a two-dimensional output image space suitable for displaying on a display screen. In an embodiment, the adaptive dewarping module 158 applies a projection function that includes one or more input parameters affecting how the pixels of the crop region is mapped to an output image. The input parameters may be selected to maintain high conformity within the region of interest (i.e., maintaining relative proportions of features within a localized region of the image). For example, if the region of interest includes a human face, the input parameters may be selected to dewarp the image in a way that causes the face to appear naturally proportioned with high conformity and without substantial distortion. Particularly, in the context of a human face, certain type of projections may result in distortion that is larger near a top of an image and is particularly pronounced when a person bends his/her head the top of the field of view. Due to perspective distortion, the projected image may cause the person's head or portions thereof to appear disproportionally large if the input parameter is not adjusted accordingly relative to when the person's head is positioned closer to a center of the image. Thus, the input parameter may adapt from frame to frame as the location of the crop region moves to avoid significant perspective distortion and substantially preserve conformity of the object of interest. This may result in stretching regions of the output image that do not correspond to the object of interest, but this less noticeable to a viewer. The adaptive dewarping module 158 is described in further detail below with respect to FIG. 2.

In an alternative embodiment, the adaptive dewarping module 158 is integrated with the camera sub-system 126 so that the camera sub-system 126 directly outputs dewarped images. In other alternative embodiments, the adaptive dewarping module 158 may operate on video frames received from a remote device via the network 110.

Figure 2:
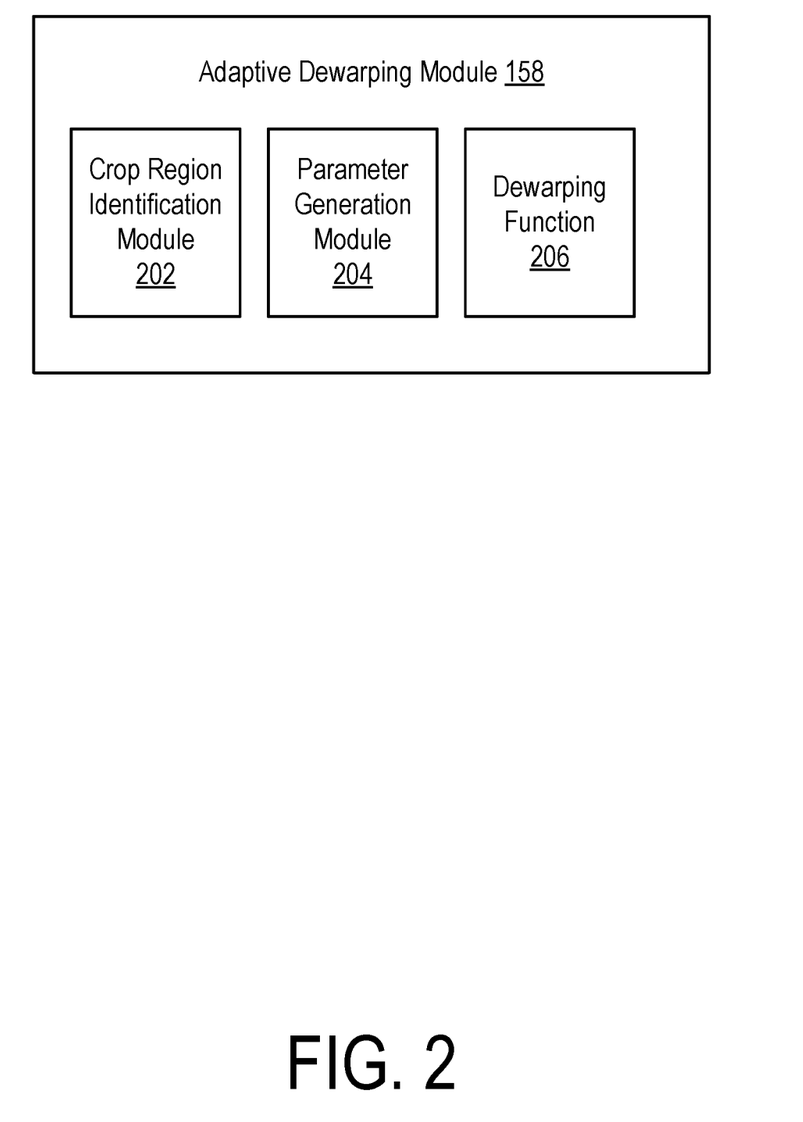
FIG. 2 is a block diagram of an example embodiment of an adaptive dewarping module, in accordance with an embodiment.

FIG. 2 illustrates an example embodiment of an adaptive dewarping module 158. The adaptive dewarping module 158 comprises a crop region identification module 202, a parameter generation module 204, and a dewarping function 206. In alternative embodiments, the adaptive dewarping module 158 may comprise additional or different components.

The crop region identification module 202 detects a region of interest within the video frame for cropping. For example, the crop region identification module 202 may detect a location of a face, a human subject, or other object of interest and identify parameters of a bounding shape (e.g., a rectangle) bounding the detected object. In an embodiment, the crop region identification module 202 may identify a different region of interest in each frame. For example, the crop region identification module 202 may apply a tracking algorithm that detects a location of a face or other object of interest in a video frame based in part on a previously detected location in one or more prior video frames. In an embodiment, the crop region identification module 202 may be integrated with the camera sub-system 126. For example, the camera sub-system 126 may include a "smart camera" that performs image processing and automatically identifies crop regions associated with a detected object of interest.

Figure 4:
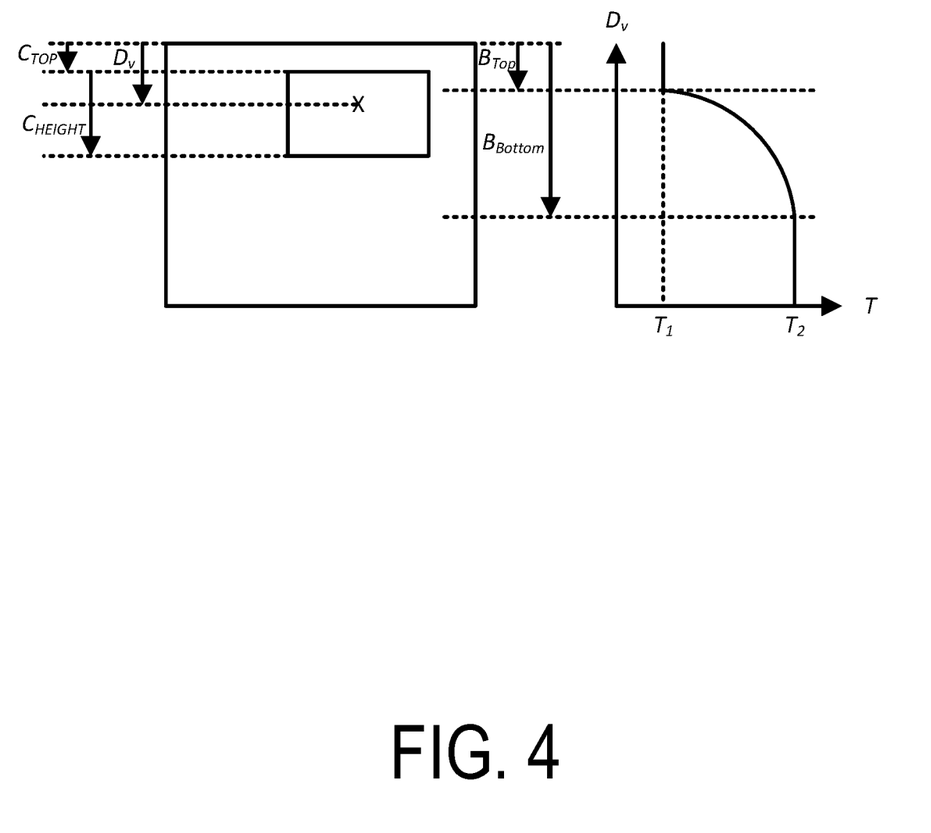
FIG. 4 is a diagram illustrating an example embodiment of a function for determining an input parameter to an adaptive dewarping function based on a selected crop region.

The parameter generation module 204 generates one or more input parameters to the dewarping function 206 based on the detected crop region identified by the crop region identification module 202. The input parameter is computed in a manner that minimizes perceived distortion to an object of interest in the crop region when projection function 206 is applied. FIG. 4 illustrates an example embodiment of a technique for generating the input parameter. In an embodiment, the parameter generation module 202 approximates a vertical position of a target $D_v$ (e.g., an object of interest) in the uncropped image based on the received crop region. Here, for example, it may be determined that the vertical position of the target is located at a fixed percentage of the crop region height from the vertical position of the top edge of the crop region. For example, the vertical position of the target may be computed as:

$$D_v = C_{Top}(C_{HEIGHT})(K)$$

where $D_v$ is the vertical position of the target represented as a distance from the top edge of the uncropped image, $C_{TOP}$ is the vertical location of the top edge of the crop region measured from the top edge of the uncropped image, $C_{HEIGHT}$ is the height of the crop region, and K is a predefined percentage (e.g., K=20%).

The parameter generation module 204 then computes a tilt parameter T based on the vertical position $D_v$ of the target. For example, the parameter generation module 204 applies a piecewise function in which the tilt parameter T is set to a first predefined value (e.g., 0 degrees) when the target vertical position $D_v$ is above a top bound, the tilt parameter T is set to a second predefined value (e.g., 20 degrees) when the target vertical position $D_v$ is below a bottom bound, and the tilt parameter T is computed as a function of $D_v$ when $D_v$ is between the top and bottom bounds. For example, the parameter generation module 204 may apply the following function:

$$T = \begin{cases} T_1 & \text{when } D_v \leq B_{Top} \\ T_1 + (T_2 - T_1)D_v'^2 - Fv & \text{when } B_{Top} < D_v < B_{Bottom} \\ T_2 & \text{when } D_v \geq B_{Bottom} \end{cases}$$

where $B_{TOP}$ and $B_{BOTTOM}$ are fixed predefined vertical positions in the uncropped image measured from the top of the uncropped image and where $B_{TOP} < B_{BOTTOM}$, $D'_v$ is a normalized vertical position in the uncropped image represented as a normalized distance from the top edge of the uncropped image, $F_v$ is a vertical focus angle of the camera relative to an Earth horizon, $T_1$ is a first predefined tilt angle (e.g., 0 degrees) and $T_2$ is a second predefined tilt angle (e.g., 20 degrees) where $T_1 < T_2$. In an embodiment, D is between 0.0 and 1.0 and is computed as $D'_v = (D_v - B_{Top})/(B_{Bottom} - B_{Top})$. In an embodiment, the vertical focus angle $F_v$ of the camera may be fixed (e.g., $F_v=0$). Alternatively, in an embodiment where the camera has an adjustable vertical focus angle, the parameter generation module 204 may obtain the vertical focus angle of the camera $F_v$ from an accelerometer integrated with the camera sub-system 126 for the purpose of performing the tilt parameter computation above.

The dewarping function 206 projects the pixel data in the cropped region to a dewarped image based on the input parameter received from the parameter generation module 204. Generally, the dewarping function 206 is designed to project the video data in a way that renders the object of interest in the crop region without significant visible distortion by centering the projection around the location of the target in accordance with the input parameter. For example, in an embodiment, a Mercator projection is applied that maps pixels of the crop region to the output image as:

$$x' = x$$

$$y' = \operatorname{atan}(\sinh(y+T))$$

where (x',y') are output coordinates corresponding to a point in the dewarped video frame expressed as horizontal and vertical angles respectively between a center of the camera and the point in the scene, and (x,y) are input coordinates corresponding to a point in the crop region of the input image expressed as horizontal and vertical angles respectively between the center of the camera and the point in the scene. The output coordinates of the projection (x',y') may then be mapped to actual discrete pixel coordinates by performing proportional stretching to generate the dewarped video frame. Thus, the projection function adjusts a vertical position y of the point in the crop region by the tilt parameter T and projects the adjusted vertical position y+T to the point in the dewarped video frame. The projection thus adapts with the tilt parameter T in each frame of video as the object of interest moves and the crop region changes.

The above-described dewarping algorithm beneficially preserves local conformity (shape) in the region of interest. that may include a face or other object of importance. Thus, to avoid shape distortion, the adaptive dewarping algorithm beneficially adjusts the parameter of the project to maintain the object of interest within a vertical range that maintains local conformity within an acceptable range.

Figure 3:
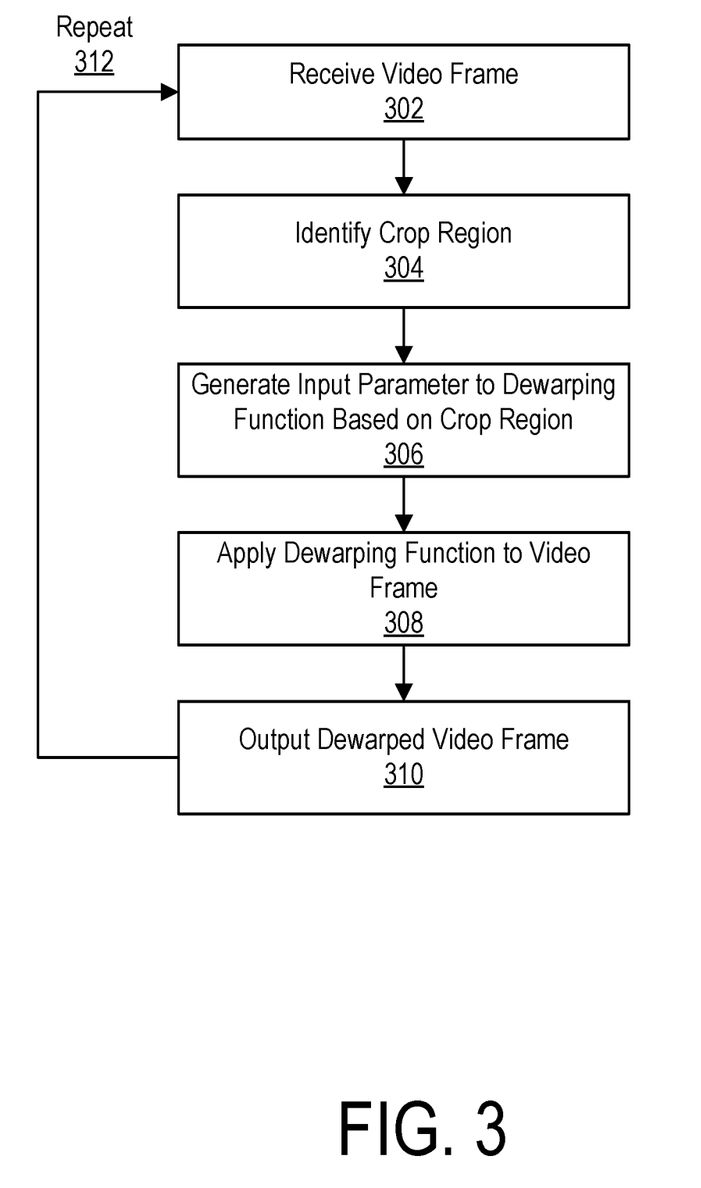
FIG. 3 is a flowchart illustrating an example embodiment of a process for performing an adaptive dewarping of wide angle video frames, in accordance with an embodiment.

FIG. 3 is a flowchart illustrating an example embodiment of a process for adaptively dewarping video frames. A video frame 302 is received (e.g., from a wide angle, panoramic, or spherical camera) comprising an array of pixels. A crop region is detected 304 in the video frame comprising a subset of pixels bound by a bounding shape (e.g., a rectangle) corresponding to an object of interest. One or more input parameters to a dewarping function are generated 306 based on the detected location of the crop region. The one or more input parameters are generated such that when applied to the dewarping function for the video frame, a region around the object of interest remains substantially undistorted. The dewarping function is then applied 308 to the video frame based on the crop region and the input parameter to generate a dewarped crop region as a dewarped video frame. The dewarped video frame 310 is outputted. This process may repeat 312 for subsequent frames. Beneficially, the dewarping function adapts to the location of the object of interest as it moves between video frames to keep the object of interest relatively undistorted in the output video.

In other alternative embodiments, the above described adaptive dewarping module 158 and the process of FIG. 3 may be embodied in a video processing system that does not necessarily have the architecture of the communication system 120 described above. For example, the adaptive dewarping module 158 and the process of FIG. 3 may be embodied in a different type of video camera system or video playback system.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a video frame captured by a wide angle camera;
    responsive to detecting an object of interest in the video frame, determining a crop region of the video frame bounding the object of interest;
    determining, based on the crop region, a vertical distance between a position of the object of interest in the video frame and a top of the video frame;
    determining a tilt parameter as a function of the vertical distance, wherein for at least a middle range of vertical distances, the tilt parameter increases non-linearly with increasing vertical distance between a first predefined tilt parameter value and a second predefined tilt parameter value;
    applying a dewarping function to the crop region to project a point in the crop region to a projected point in a dewarped video frame such that a vertical position of the point in the crop region is adjusted using the tilt parameter and is projected to an output vertical position of the projected point in the dewarped video frame, the dewarping function causing the projected point of the dewarped video frame to have increased local conformity with decreased distance from the vertical position; and
    outputting the dewarped video frame.

2. The method of claim 1, wherein for a full range of vertical distances the function of the vertical distance maps the vertical distance to the tilt parameter such that the tilt parameter is non-increasing as the vertical distance decreases.

3. The method of claim 1, wherein determining the tilt parameter further comprises:
    setting the tilt parameter to the first predefined tilt value responsive to the vertical distance being less than a first vertical boundary;
    setting the tilt parameter to the second predefined tilt value responsive to the vertical distance being greater than a second vertical boundary; and
    responsive to the vertical distance being in between the first vertical boundary and the second vertical boundary, computing a normalized vertical distance from the vertical boundary, and computing the tilt parameter by applying a square of the normalized vertical distance to a difference between the first and second predefined tilt values.

4. The method of claim 3, further comprising:
    obtaining accelerometer data from the wide angle camera; and
    determining a vertical focus angle of the wide angle camera from the accelerometer data; and
    wherein computing the tilt parameter based on the square of the normalized vertical distance comprises computing the tilt parameter as a difference between the square of the normalized vertical distance and the vertical focus angle.

5. The method of claim 1, wherein applying the dewarping function comprises applying a Mercator projection.

6. A non-transitory computer-readable storage medium storing instructions executable by one or more processors, the instructions when executed causing the one or more processors to perform steps including:
   receiving a video frame captured by a wide angle camera;
   responsive to detecting an object of interest in the video frame, determining a crop region of the video frame bounding the object of interest;
   determining, based on the crop region, a vertical distance between a position of the object of interest in the video frame and a top of the video frame;
   determining a tilt parameter as a function of the vertical distance, wherein for at least a middle range of vertical distances, the tilt parameter increases non-linearly with increasing vertical distance between a first predefined tilt parameter value and a second predefined tilt parameter value;
   applying a dewarping function to the crop region to project a point in the crop region to a projected point in a dewarped video frame such that a vertical position of the point in the crop region is adjusted using the tilt parameter and is projected to an output vertical position of the projected point in the dewarped video frame, the dewarping function causing the projected point of the dewarped video frame to have increased local conformity with decreased distance from the vertical position; and
   outputting the dewarped video frame.

7. The non-transitory computer-readable storage medium of claim 6, wherein for a full range of vertical distances the function of the vertical distance maps the vertical distance to the tilt parameter such that the tilt parameter is non-increasing as the vertical distance decreases.

8. The non-transitory computer-readable storage medium of claim 6, wherein determining the tilt parameter further comprises:
   setting the tilt parameter to the first predefined tilt value responsive to the vertical distance being less than a first vertical boundary;
   setting the tilt parameter to the second predefined tilt value responsive to the vertical distance being greater than a second vertical boundary; and
   responsive to the vertical distance being in between the first vertical boundary and the second vertical boundary, computing a normalized vertical distance from the vertical boundary, and computing the tilt parameter by applying a square of the normalized vertical distance to a difference between the first and second predefined tilt values.

9. The non-transitory computer-readable storage medium of claim 8, the instructions when executed by the one or more processors further causing the one or more processors to perform steps including:
   obtaining accelerometer data from the wide angle camera; and
   determining a vertical focus angle of the wide angle camera from the accelerometer data; and
   wherein computing the tilt parameter based on the square of the normalized vertical distance comprises computing the tilt parameter as a difference between the square of the normalized vertical distance and the vertical focus angle.

10. The non-transitory computer-readable storage medium of claim 6, wherein applying the dewarping function comprises applying a Mercator projection.

11. A computer system comprising:
   one or more processors; and
   a non-transitory computer-readable storage medium storing instructions executable by one or more processors, the instructions when executed causing the one or more processors to perform steps including:
      receiving a video frame captured by a wide angle camera;
      responsive to detecting an object of interest in the video frame, determining a crop region of the video frame bounding the object of interest;
      determining, based on the crop region, a vertical distance between a position of the object of interest in the video frame and a top of the video frame;
      determining a tilt parameter as a function of the vertical distance, wherein for at least a middle range of vertical distances, the tilt parameter increases non-linearly with increasing vertical distance between a first predefined tilt parameter value and a second predefined tilt parameter value;
      applying a dewarping function to the crop region to project a point in the crop region to a projected point in a dewarped video frame such that a vertical position of the point in the crop region is adjusted using the tilt parameter and is projected to an output vertical position of the projected point in the dewarped video frame, the dewarping function causing the projected point of the dewarped video frame to have increased local conformity with decreased distance from the vertical position; and
      outputting the dewarped video frame.

12. The computer system of claim 11, wherein for a full range of vertical distances the function of the vertical distance maps the vertical distance to the tilt parameter such that the tilt parameter is non-increasing as the vertical distance decreases.

13. The method of claim 3, wherein determining the tilt parameter further comprises:
   determining the tilt parameter as an addition of the first predefined tilt value and the difference.

14. The non-transitory computer-readable storage medium of claim 8, wherein determining the tilt parameter further comprises:
   determining the tilt parameter as an addition of the first predefined tilt value and the difference.

15. The computer system of claim 11, wherein determining the tilt parameter further comprises:
   setting the tilt parameter to a first tilt value responsive to the vertical distance being less than a first vertical boundary;
   setting the tilt parameter to a second predefined tilt value responsive to the vertical distance being greater than a second vertical boundary; and
   responsive to the vertical distance being in between the first vertical boundary and the second vertical boundary, computing a normalized vertical distance from the vertical boundary, and computing the tilt parameter by applying a square of the normalized vertical distance to a difference between the first and second predfined tilt values.

16. The computer system of claim 15, the instructions when executed by the one or more processors further causing the one or more processors to perform steps including:
   obtaining accelerometer data from the wide angle camera;
   determining a vertical focus angle of the wide angle camera from the accelerometer data; and wherein computing the tilt parameter based on the square of the normalized vertical distance comprises computing the tilt parameter as a difference between the square of the normalized vertical distance and the vertical focus angle.

17. The computer system of claim 11, wherein applying the dewarping function comprises applying a Mercator projection.

* * * * *

UNITED STATES PATENT AND TRADEMARK OFFICE
CERTIFICATE OF CORRECTION

PATENT NO. : 11,087,435 B1
APPLICATION NO. : 16/673740
DATED : August 10, 2021
INVENTOR(S) : Josiah Vincent Vivona et al.

It is certified that error appears in the above-identified patent and that said Letters Patent is hereby corrected as shown below:

In the Claims

In Column 12, Claim 14, Lines 41-42, delete "The non-transitory computer-readable storage medium of claim" and insert -- The computer system of claim --, therefor.

In Column 12, Claim 15, Line 59, delete "predfined" and insert -- predefined --, therefor.

Signed and Sealed this
Sixteenth Day of August, 2022

Katherine Kelly Vidal
*Director of the United States Patent and Trademark Office*